(12) United States Patent
Spencer et al.

(10) Patent No.: US 6,279,081 B1
(45) Date of Patent: Aug. 21, 2001

(54) SYSTEM AND METHOD FOR PERFORMING MEMORY FETCHES FOR AN ATM CARD

(75) Inventors: Thomas V Spencer; Robert J Horning, both of Ft Collins, CO (US); Monish S Shah, San Jose, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/218,226

(22) Filed: Dec. 22, 1998

(51) Int. Cl.[7] ........................................................ G06F 12/00
(52) U.S. Cl. ............................ 711/137; 711/117; 711/118
(58) Field of Search ..................................... 711/137, 117, 711/118; 710/35; 370/905, 395

(56) References Cited

U.S. PATENT DOCUMENTS

| | | | |
|---|---|---|---|
| 5,446,863 | 8/1995 | Stevens et al. | 395/427 |
| 5,608,878 | 3/1997 | Arimilli et al. | 395/287 |
| 5,611,071 | * 3/1997 | Martinez, Jr. | 710/35 |
| 5,673,414 | 9/1997 | Amini et al. | 395/473 |
| 5,724,549 | 3/1998 | Selgas et al. | 395/468 |
| 5,745,488 | 4/1998 | Thompson et al. | 370/395 |
| 5,761,707 | 6/1998 | Aiken et al. | 711/118 |
| 5,809,022 | 9/1998 | Byers et al. | 370/395 |
| 5,813,036 | 9/1998 | Ghosh et al. | 711/146 |
| 6,026,090 | * 2/2000 | Benson et al. | 370/395 |
| 6,170,030 | * 1/2001 | Bell | 710/129 |

OTHER PUBLICATIONS

5515/5525/5575 PCI ATM Adapter Users Guide [Online] Available: ftp://ftp.iphase.com/pub/atm/pci/doc/5575000b.pdf, Dec. 12, 1997.*

* cited by examiner

Primary Examiner—Do Hyun Yoo
Assistant Examiner—Yamir Encarnación (57) ABSTRACT

The present invention is generally directed to a system and method for fetching data from a system memory to an ATM card. The method includes the steps of receiving a request (via a PCI bus) to fetch data from memory, and identifying the request as an ATM request. The method then determines, based on the start address, the number of cache lines that will be implicated by the fetch. Then, the method automatically fetches the appropriate number of cache lines into the cache, and then passes the data to the ATM card, via the PCI bus. In accordance with another aspect of the present invention, a system is provided for fetching data from memory for an ATM card. Broadly, the system includes a system memory for data storage and a cache memory for providing high-speed (retrieval) temporary storage of data, the cache memory being disposed in communication with the system memory via a high-speed system bus. The system further includes a PCI bus in communication with the cache memory via an input/output (I/O) bus. A first mechanism is configured to identify a fetch for data from memory to the PCI bus by an ATM card. A second mechanism is configured to determine the number of lines of the cache memory that will be implicated by the identified fetch. Finally, a third mechanism is configured to automatically fetch the appropriate number of lines from the cache memory and to pass the data to the PCI bus.

10 Claims, 6 Drawing Sheets

SYSTEM AND METHOD FOR PERFORMING MEMORY FETCHES FOR AN ATM CARD

BACKGROUND OF THE INVENTION

1. Field of the Invention

The present invention generally relates to computer systems, and more particularly to a system for performing high-speed data transfers from a computer system memory to an ATM (asynchronous transfer mode) card, via a cache memory.

2. Discussion of the Related Art

In computer system design, a principal objective is to continually design faster and more efficient computer systems. In this regard, most conventional high-performance computer systems include cache memories. As is known, a cache memory is a high-speed memory that is positioned between a microprocessor and main memory in a computer system in order to improve system performance. Typically, cache memories (or caches) store copies of portions of main memory data that are actively being used by the central processing unit (CPU) while a program is running. Since the access time of a cache can be faster than that of main memory, the overall access time can be reduced.

Even though cache memories typically increase system performance, further improvements are desired. For example, consider a computer system having separate busses, such as a system bus that interconnects a central processing unit (e.g., a microprocessor), memory, etc., and an I/O bus (e.g., ISA bus, PCI bus, etc). One of the bottlenecks that has limited the performance of personal computers in the past has been the maximum specified speed of the I/O bus. In original IBM PC AT computers manufactured by IBM Corp., the I/O bus operated with a data rate of 8 MHz (BCLK=8 MHz). This was an appropriate data rate at that time since it was approximately equivalent to the highest data rates which the CPUs of that era could operate with on the host bus. CPU data rates are many times faster today, however, so the slow speed of the I/O bus severely limits the throughput of systems today. One solution for this problem has been the development of local bus standards, by which certain devices which were traditionally located on the I/O bus can now be located on the host bus—e.g., the VESA VL-Bus Local Bus Standard.

Another solution to the problem has been the development of another standard, referred to herein as the PCI standard. The PCI bus achieves very high performance, in part because its basic data transfer mode is by burst. That is, data is always transferred to or from a PCI device in a known sequence of data units defined by a known sequence of data unit addresses in an address space. In a "cache line" burst mode, a predetermined number of transfers take place. In a "linear" burst mode, any number of transfers (including 1) can take place to/from linearly sequential addresses until either the initiator or the target terminates the transaction. In either mode, the initiator need only specify the starting address because both parties know the sequence of addresses which follow.

The implementation of the PCI bus is well known in the industry and its specifications are available to the public. In transferring data to and from a high speed industry standard common bus, often it is desirable to provide an intermediate local cache buffer for the data to allow the bus to maintain full bandwidth. That is, it is desirable to maintain full utilization of the I/O bus that interfaces the PCI bus to the cache, without overtaxing the system bus. For example, when data is fetched from memory to the cache, it is fetched one cache line at a time.

When data is first requested by a device on the PCI bus, there is an initial latency period (idle I/O clock cycles) while the first cache line of data is retrieved from memory to the cache. If the PCI transfer requires more than one cache line of data, then another latency period is encountered while the next cache line of data is retrieved from system memory to the cache. Intermittent latency periods are encountered each time a new line of data is read from memory to the cache. It would therefore be desirable to eliminate or significantly reduce these latency periods. One way of achieving this goal is to always pre-fetch an additional cache line of data. For example, initially two cache lines of data could be retrieved from memory to the cache. After the first line of data has been transferred from the cache to the PCI bus and the second line is being transferred to the PCI bus, then an additional cache line of data could be fetched from memory into the cache.

While this approach would reduce the idle cycles encountered on the I/O bus, it realizes an inefficient utilization of system resources. The problem with this approach is that it over-fetches data from memory into the cache (by one cache line). Therefore, it unnecessarily consumes bandwidth of the system bus. In addition, it wastes a portion of the cache memory. Such poor utilization of the cache memory space denigrates overall system performance.

Accordingly, there is a desire to provide an improved system and method for interfacing a cache to a PCI bus that overcomes the above-identified and other shortcomings.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for fetching data from a system memory to an ATM card. In accordance with one aspect of the invention, a method is provided that includes the steps of receiving a request (via a PCI bus) to fetch data from system memory, and identifying the request as an ATM request. The method then determines, based on the start address, the number of cache lines that will be implicated by the fetch. Then, the method automatically fetches the appropriate number of cache lines into the cache, and then passes the data to the ATM card, via the PCI bus.

In a system constructed in accordance with the preferred embodiment of the present invention, the cache line size is 64 bytes. Therefore, if the start address of the ATM request is near the beginning of the cache line, then only one cache line will be implicated in the fetch from the system memory into the cache memory. If, alternatively, the start address is near the middle or toward the end of the cache line of data, then two lines of cache data will be implicated (and fetched) by the request. In a system having a smaller cache line size, for example a 32 byte cache line, then as many as three cache lines may be implicated by a fetch request, depending upon the start address of the fetch. The method determines the number of lines implicated by a fetch request by evaluating the equation: end address=start address+48. This equation implicitly recognizes that ATM fetches involve precisely 48 bytes of data (also called cell payload). If the end address is in the same cache line as the start address, then only one cache line is implicated. If, however, the end address is not in the same cache line as the start address, then two or more cache lines are implicated. In cache devices having even smaller cache lines, additional lines may be implicated as well.

In accordance with another aspect of the present invention, a system is provided for fetching data from memory for an ATM card. Broadly, the system includes a system memory for data storage and a cache memory for providing high-speed (retrieval) temporary storage of data, wherein the cache memory is disposed in communication with the system memory via a high-speed system bus. The system further includes a PCI (peripheral component interface) bus in communication with the cache memory via an input/output (I/O) bus. A first mechanism is configured to identify a fetch for data from memory to the PCI bus by an ATM card. A second mechanism is configured to determine the number of lines of the cache memory that will be implicated by the identified fetch. Finally, a third mechanism is configured to automatically fetch the appropriate number of lines from the cache memory and to pass the data to the PCI bus. As will be appreciated, the first, second, and third mechanisms may be implemented in a variety of ways, consistent with the present invention. However, in the preferred implementation, the mechanisms are implemented in dedicated hardware that is configured to control the fetching of data from the system memory into the cache memory, and the further transfer of this data from the cache memory to the ATM card via the PCI bus.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
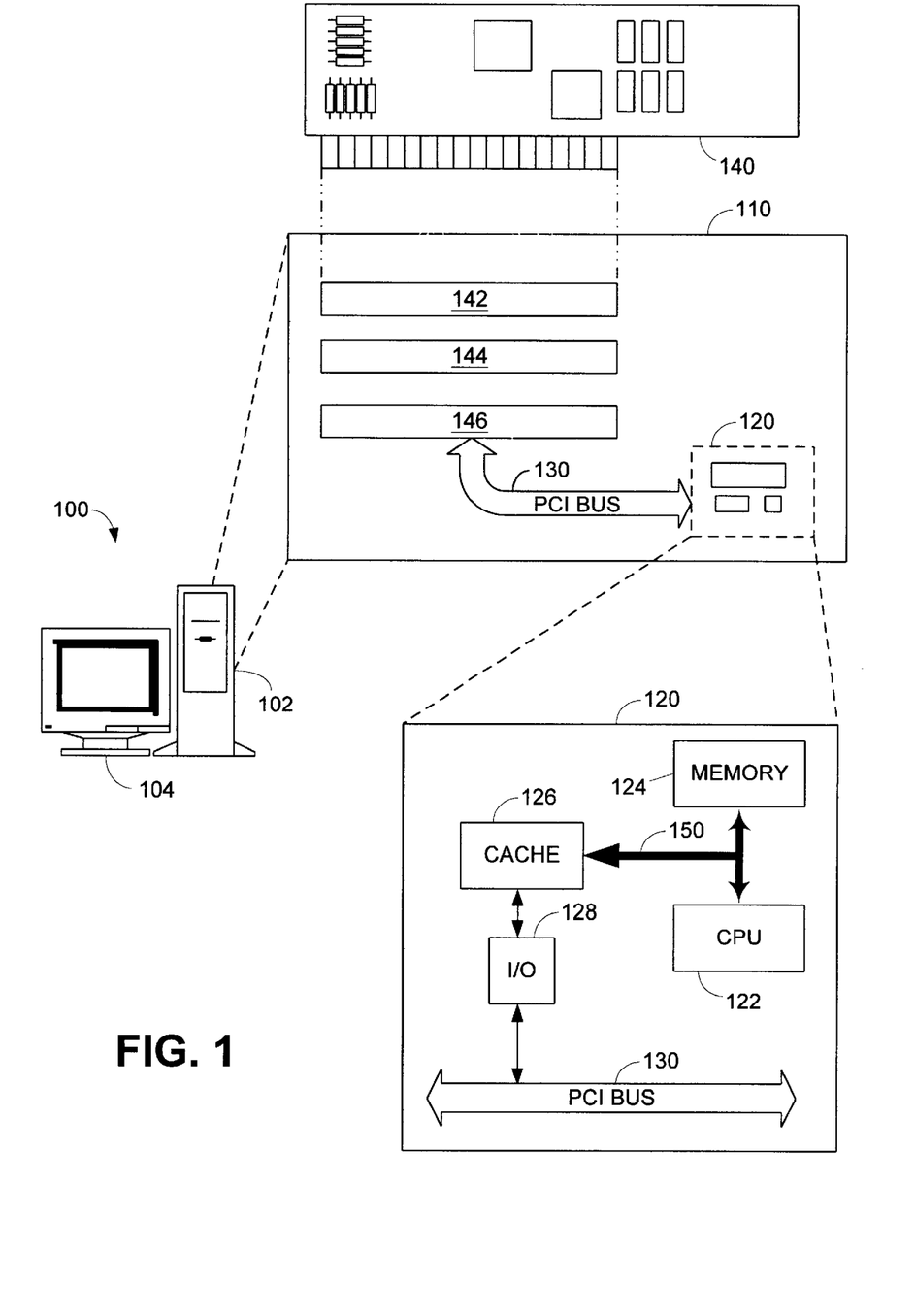
FIG. 1 is a block diagram of high-performance computer system having an ATM card in communication with the cache memory across a PCI bus.

Referring now to the drawings, reference is made to FIG. 1, which shows a computer system 100 defining an environment that typifies the environment of the present invention. In this regard, the computer system 100 may be any of a variety of high-performance computing systems, such a high-end desktop computing system having a computer 102 and monitor 104. Although the computer 102 may come in a variety of forms, a typical computer 102 will include a motherboard 110. As is known, the motherboard 110 typically includes various on-board integrated circuit components 120. These on-board integrated circuit components 120 may include devices like a CPU 122 (e.g., a microprocessor), a memory 124, and a variety of other integrated circuit devices known and included in computer architectures.

Another integrated circuit device, whether located on the motherboard or located on a plug-in card, is a cache memory 126. The cache memory 126 is disposed in communication with a PCI bus 130 via I/O circuitry 128. Consistent with the concepts and teachings of the present invention, a variety of other circuit components may be included within the computer system 100 as well. Indeed, a variety of other support circuits and additional functional circuitry are typically included in most high-performance computing systems. The addition and implementation of other such circuit components will be readily understood by persons of ordinary skill in the art, and need not be described herein. Instead, the computing system 100 of FIG. 1 has been illustrated with only a select few components in order to better illustrate the concepts and teachings of the present invention.

As is further known, in addition to various on-board circuit components, computing systems usually include expansion capability. In this regard, most computing systems 100 include a plurality of expansion slots 142, 144, 146, which allow integrated circuit cards to be plugged into the motherboard 110 of the computing system 100. More particularly, expansion cards 140 typically provide some specialized functionality that may not be desired for all uses of a computing system, but rather for specialized uses of certain user groups. For example, a modem card (not shown) allows a computing system 100 to communicate voice, data, and other information to remote computing systems or users over a telecommunication link. It will be appreciated that items like the CPU 122, the memory 124, and the cache 126, although illustrated as being disposed on the motherboard 110, may be provided instead on expansion cards. It will be appreciated that the particular embodiment illustrating FIG. 1 has been presented merely for purposes of illustration and should not be deemed to be limiting on the scope the present invention.

Although a variety of expansion cards may be utilized in connection with the computing system 100, for purposes of the present invention, only one has been illustrated. Specifically, the expansion card 140 has been illustrated herein is an ATM card 140. The ATM card 140, much like a modem, allows the computing system 100 to communicate with remote systems via telecommunications link. As is known, there are a wide variety of standards and protocols used in the telecommunications industry. ATM, which will be further described below, is just one example of a telecommunication standard. The ATM card 140, therefore, allows the computing system 100 to communicate with remote systems in accordance with the ATM standard.

Also illustrated in FIG. 1 are both a system bus 150 and a PCI bus 130. Generally speaking, the system bus 150 is a high-speed bus that interconnects the memory 124, the CPU 122, the cache 126, and other devices (not shown) that may be included within the computing system 100. Communications to and from the ATM card 140 may be communicated to the remainder of the computing system 100 via the PCI bus 130. As will be further described below, the present invention is direct to a system and method for enhancing the overall performance, operation, and efficiency of the computing system 100 when fetching data from the system memory 124 to the PCI bus 130 for communication via the ATM card 140.

However, before discussing the specifics of the present invention, some fundamental information will first be provided on cache memory devices and ATM communications. This information is provided merely for purposes of completeness in describing systems constructed in accordance with teachings of the present invention. It should be understood, however, the persons of ordinary skill in the will understand and appreciate the concepts and operation of cache memory devices and ATM communications set forth below.

Cache Basics

As previously mentioned, a cache memory is a high-speed memory that is positioned between a microprocessor and main memory in a computer system in order to improve system performance. Cache memories (or caches) store copies of portions of main memory data that are actively being used by the central processing unit (CPU) while a program is running. Since the access time of a cache can be faster than that of main memory, the overall access time can be reduced.

Many microprocessor-based systems implement a "direct mapped" cache memory. In general, a direct mapped cache memory comprises a high-speed data Random Access Memory (RAM) and a parallel high-speed tag RAM. The RAM address of each line in the data cache is the same as the low-order portion of the main memory line address to which the entry corresponds, the high-order portion of the main memory address being stored in the tag RAM. Thus, if main memory is thought of as $2^m$ blocks of $2^n$ "lines" of one or more bytes each, the $i^{th}$ line in the cache data RAM will be a copy of the $i^{th}$ line of one of the $2^m$ blocks in main memory. The identity of the main memory block that the line came from is stored in the $i^{th}$ location in the tag RAM.

When a CPU requests data from memory, the low-order portion of the line address is supplied as an address to both the cache data and cache tag RAMs. The tag for the selected cache entry is compared with the high-order portion of the CPU's address and, if it matches, then a "cache hit" is indicated and the data from the cache data RAM is enabled onto a data bus of the system. If the tag does not match the high-order portion of the CPU's address, or the tag data is invalid, then a "cache miss" is indicated and the data is fetched from main memory. It is also placed in the cache for potential future use, overwriting the previous entry. Typically, an entire line is read from main memory and placed in the cache on a cache miss, even if only a byte is requested. On a data write from the CPU, either the cache RAM or main memory or both may be updated, it being understood that flags may be necessary to indicate to one that a write has occurred in the other.

Accordingly, in a direct mapped cache, each "line" of secondary memory can be mapped to one and only one line in the cache. In a "fully associative" cache, a particular line of secondary memory may be mapped to any of the lines in the cache; in this case, in a cacheable access, all of the tags must be compared to the address in order to determine whether a cache hit or miss has occurred. "k-way set associative" cache architectures also exist which represent a compromise between direct mapped caches and fully associative caches. In a k-way set associative cache architecture, each line of secondary memory may be mapped to any of k lines in the cache. In this case, k tags must be compared to the address during a cacheable secondary memory access in order to determine whether a cache hit or miss has occurred. Caches may also be "sector buffered" or "sub-block" type caches, in which several cache data lines, each with its own valid bit, correspond to a single cache tag RAM entry.

When the CPU executes instructions that modify the contents of the cache, these modifications must also be made in the main memory or the data in main memory will become "stale." There are two conventional techniques for keeping the contents of the main memory consistent with that of the cache—(1) the write-through method and (2) the write-back or copy-back method. In the write-through method, on a cache write hit, data is written to the main memory immediately after or while data is written into the cache. This enables the contents of the main memory always to be valid and consistent with that of the cache. In the write-back method, on a cache write hit, the system writes data into the cache and sets a "dirty bit" which indicates that a data word has been written into the cache but not into the main memory. A cache controller checks for a dirty bit before overwriting any line of data in the cache, and if set, writes the line of data out to main memory before loading the cache with new data.

A computer system can have more than one level of cache memory for a given address space. For example, in a two-level cache system, the "level one" (L1) cache is logically adjacent to the host processor. The second level (L2) cache is logically behind the first level cache, and DRAM memory (which in this case can be referred to as tertiary memory) is located logically behind the second level cache. When the host processor performs an access to an address in the memory address space, the first level cache responds if possible. If the first level cache cannot respond (for example, because of an L1 cache miss), then the second level cache responds if possible. If the second level cache also cannot respond, then the access is made to DRAM itself The host processor does not need to know how many levels of caching are present in the system or indeed that any caching exists at all. Similarly, the first level cache does not need to know whether a second level of caching exists prior to the DRAM. Thus, to the host processing unit, the combination of both caches and DRAM is considered merely as a single main memory structure. Similarly, to the L1 cache, the combination of the L2 cache and DRAM is considered simply as a single main memory structure. In fact, a third level of caching could be included between the L2 cache and the actual DRAM, and the L2 cache would still consider the combination of L3 and DRAM as a single main memory structure.

If a cache line is in state E ("exclusive"), then it is not "modified" (i.e., it contains the same data as subsequent levels of the memory subsystem). In shared cache systems, state E also indicates that the cache line is available in only one of the caches. The host processor unit can access (read or write) an E-state line without generating a bus cycle to higher levels of the memory subsystem, but when the host processor performs a write access to an E-state line, the line then becomes "modified" (state M).

A line in state S ("shared") may exist in more than one cache. A read access by the host processor to an S-state line will not generate bus activity, but a write access to an S-state line will cause a write-through cycle to higher levels of the memory subsystem in order to permit the sharing cache to potentially invalidate its own corresponding line. The write will also update the data in the data cache line.

A line in state I is invalid. It is not available in the cache. A read access by the host processor unit to an I-state line will generate a "cache miss" and may cause the cache to execute a line fill (fetch the entire line into the cache from higher levels of the memory subsystem). A write access by the host processor unit to an I-state line will cause the cache to execute a write-through cycle to higher levels of the memory subsystem.

Computer system cache memories typically cache main memory data for the CPU. If the cache uses a write-back protocol, then frequently the cache memory will contain more current data than the corresponding lines in main memory. This poses a problem for other bus masters (and for other CPUs in a multiprocessor system) desiring to access a line of main memory, because it is not known whether the main memory version is the most current version of the data. Write-back cache controllers, therefore, typically support inquire cycles (also known as snoop cycles), in which a bus master asks the cache memory to indicate whether it has a more current copy of the data.

ATM Basics

ATM is a packet-based communication protocol. Each packet in a packet based communications network may perform any one of a plurality of system dependent functions. For example, in an ATM system, individual packets may be used for the delivery of user data between nodes in the network, to perform signaling functions, or to perform operation, administration, and maintenance (OAM) tasks in the network. Data delivery in an ATM network requires segmentation of data files into small portions that can each fit into the payload section of a data cell. The small portions can then be reassembled after the data cells reach a destination node. Signaling refers to the process of setting up and connecting communications links within the network. Special signaling cells exist which facilitate these operations. OAM functions in the network may include performance monitoring, defect and failure detection, system protection, fault location inspection, and others. OAM cells may be periodically delivered to nodes in the network to ensure that the network is operating properly.

Because information packets perform many different functions in a communications system, a receiving node must be capable of detecting the packet type of each packet received from the network. By identifying packet type, the receiving node can direct each received packet to a specific location for processing in accordance with packet type. Proper packet type detection/identification may also allow the network support elements to properly and accurately manage network resources and to accurately maintain an audit trail of network usage.

In a packet based communications network, packets are normally delivered to a receiving node in a continuous stream over a channel having a predetermined bandwidth. To avoid a potential loss of data in the network, the receiving node must be capable of performing the above-described operations on the incoming stream of packets in substantially real time. Due to the ever-increasing bandwidths of available communications channels, however, performance of the above-described operations in substantially real time has become increasingly difficult.

Figure 2A:
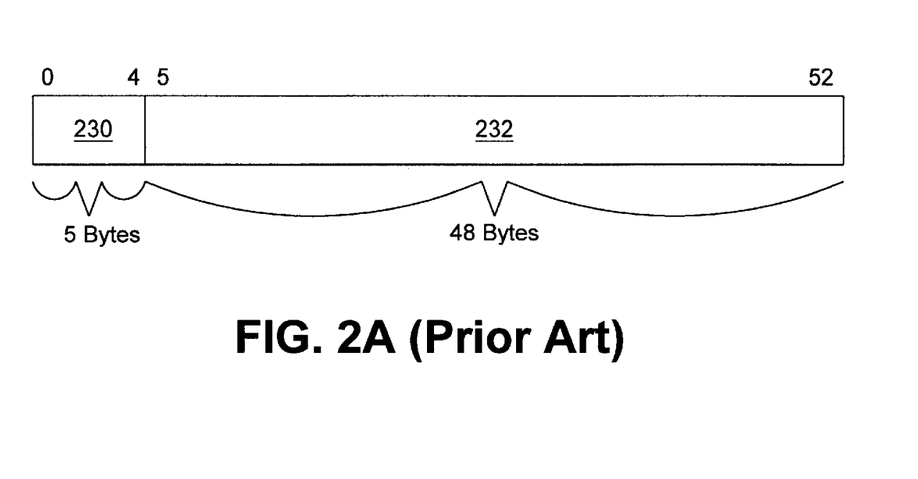
FIG. 2A is a diagram illustrating the packet format for an ATM transfer.

As described previously, ATM systems utilize fixed length information packets known as cells. As illustrated in FIG. 2A, the conventional ATM cell is 253 octets in length and includes a 5-byte header portion 230 and a 48-byte payload portion 232. The type of information in the payload portion 232 of the cell depends on the cell type. For example, a data cell generally carries user data in its payload portion 232 for delivery between nodes in the network. The user data can correspond to any one of a number of services that are to be provided by the network. The payload portion 232 of the data cell can also include a field containing ATM adaptation layer (AAL) information for use in the reassembly of the user data once received by a receiving node. An OAM cell, on the other hand, generally includes fields for OAM cell type, OAM function type, information specific to the OAM type, and CRC information in its payload portion 232. Lastly, the payload portion 232 of a signaling cell generally includes a message field, a field identifying AAL parameters, a field identifying the address of the node attempting to establish a connection, a field identifying the address of the node to which a connection is being attempted, and a field identifying the quality of service requirements for the connection. It should be noted that a signaling message can be distributed across more than one cell.

Figure 2B:
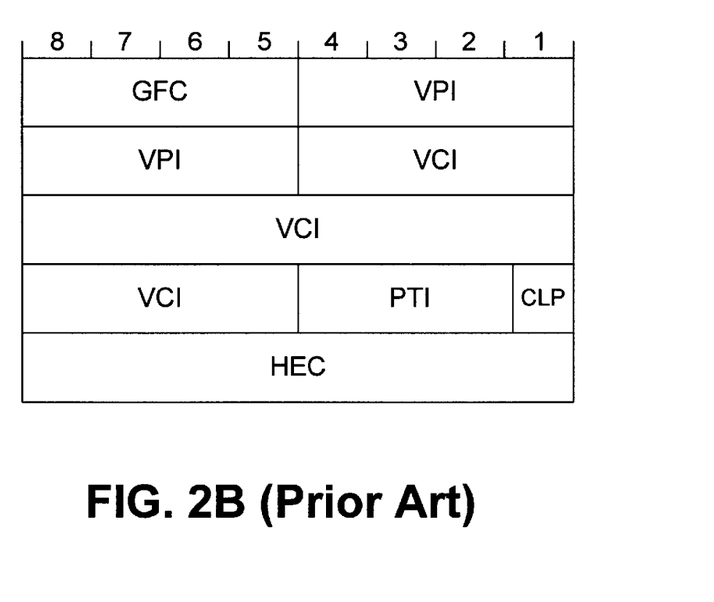
FIG. 2B is a diagram illustrating the header portion of an ATM cell.

FIG. 2B illustrates the information structure of the header portion of a conventional ATM cell at the UNI 224 and NNI 226, respectively. The only difference between the two configurations is the inclusion of a 4-bit generic flow control (GFC) field in the UNI header, which does not exist in the NNI header. This GFC field is used to provide flow control information between the TE and the network for use in, among other things, the alleviation of short term congestion. The virtual path identifier (VPI) and virtual channel identifier (VCI) fields in the ATM cell header form the routing label of the cell. As illustrated in the figures, the VPI field occupies eight bits in the UNI header and twelve bits in the NNI header, while the VCI field occupies sixteen bits for both the UNI and the NNI headers. This routing label is used to route the cell through the network from the source TE to the destination TE and may be changed by the switching nodes en route based on the configuration of the connection. Upon arrival at the destination node, the VPI/VCI values in the cell header are unique to the particular connection and, therefore, uniquely identify a single transmission source. One exception to the above description of the VPI/VCI field is in a signaling cell where the VPI/VCI fields are preassigned values based on the type of signaling message being delivered.

The payload type identifier (PTI) field in the cell header identifies the type of information being carried by the payload portion of the cell. For example, the PTI field may indicate whether the cell is a user data cell or an OAM cell. In addition, the PTI field may also carry information as to traffic congestion in the network and the user-to-user status of the cell. The PTI field is three bits in length.

The cell loss priority (CLP) field is a one-bit field that indicates the priority of a cell should a circumstance occur that requires the discarding of cells. If the CLP field contains a 1, the cell is deemed of lower priority and can be discarded before a cell having a CLP of 0. It should be noted that the CLP of a cell may be set by either the user or the network, based on the policy of the network administrator.

The header error control (HEC) field provides an eight-bit error correction/detection value based on the first four octets of the header. The HEC field allows the detection of multiple errors, as well as the correction of one error, in the header. The HEC field can also be used to perform cell delineation on an incoming bit stream.

Operation of the Present Invention

Having described certain basic aspects of both cache memory devices and ATM communications, the discussion will now be directed to the preferred embodiment of present invention. In this regard, the present invention is directed to a system and method for fetching data from a system memory 124, through a cache memory 126, to an ATM card 140, via a PCI bus 130. As previously mentioned, it is an objective of the present invention to minimize the latency that is incurred over the communication path between the PCI bus 130 and the cache memory 126 (see FIG. 1), while at the same time not overtaxing the bandwidth of the system bus 150. The present invention achieves this goal, in the context of ATM fetches, by pre-fetching the precise number of cache lines of data needed. More particularly, when data is requested by an ATM card 140 from system memory 124 via the PCI bus 130, the system and method of the present invention recognize that this request will entail a fetch of precisely 48 bytes from system memory 124. The system and method of the present invention will then compute whether this will entail reading one, two, or even more cache lines of data from the system memory 124 into the cache memory 126.

Figure 3A:
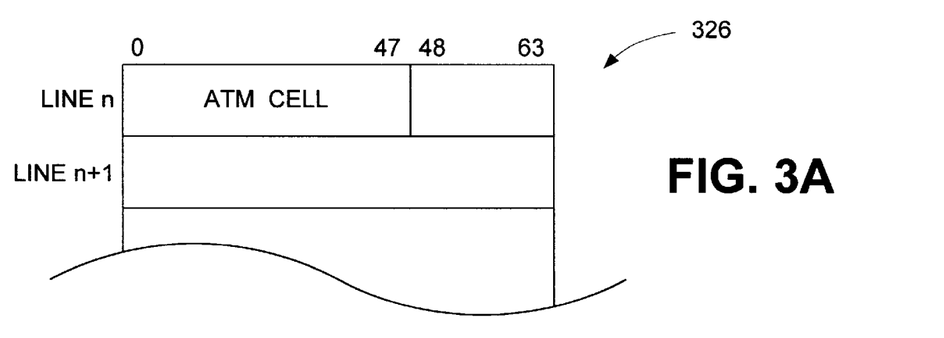
FIGS. 3A–3C are diagrams illustrating an ATM cell disposed in different locations within a cache memory having a 64 byte line size.
Figure 3B:
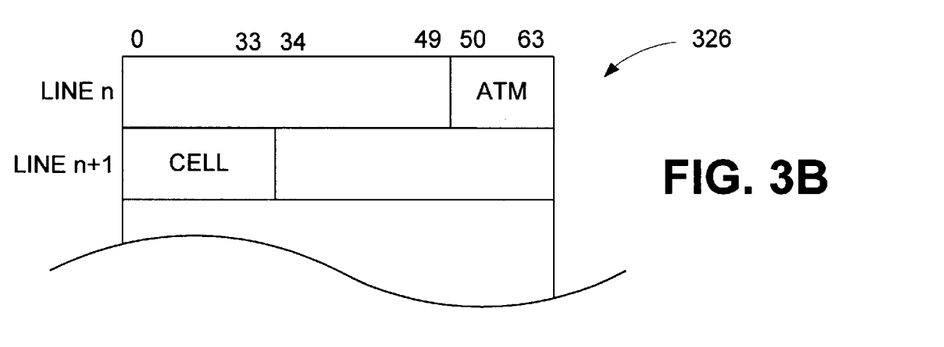
Figure 3C:
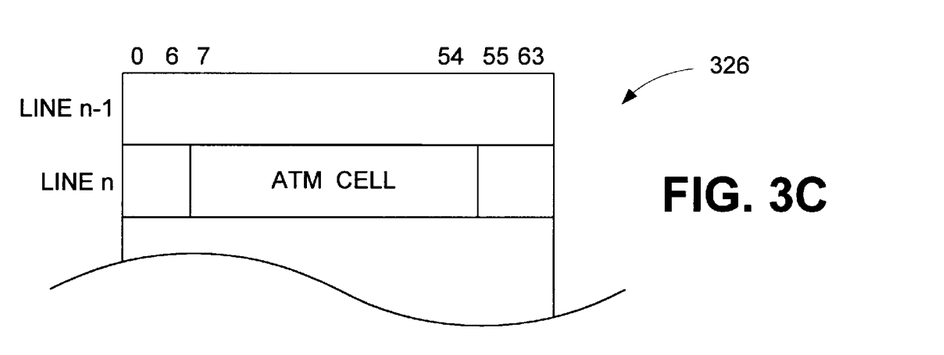

As previously mentioned, most computer systems are designed such that when data is read from system memory 124 into cache memory 126 it is read one cache line at a time. Therefore, the system and method of the preferred embodiment of the present invention carry out this calculation, based upon the understanding that 48 bytes of data will be fetched from memory 124 to the cache memory 126, the starting address of the first byte of data, and the size of each cache line. Reference is made to FIGS. 3A, 3B, and 3C, which illustrate three different alternatives of an ATM cell fetched into a cache memory 326 having a cache lines size of 64 bytes. In FIG. 3A, the starting address of the 48 bytes of the ATM cell aligns with the first byte of data in line n of the cache memory 326. Therefore, when such a request is made by an ATM card 140, only one line of data needs to the pre-fetched from the system memory to the cache memory 326.

In FIG. 3B, the starting address of the 48 bytes of the ATM cell aligns with, for example, the fifty-first byte of data in line n of the cache memory 326. Therefore, the ATM cell, being 48 bytes of data, will consume the remainder of that cache line and bytes 0 through 33 of the following cache line. Accordingly, the system and method of the present invention, upon detection of the request by the ATM card 140 to fetch data from the system memory, will immediately fetch two full cache lines of data from the system memory to the cache memory 326. As previously described, this original fetch of data from the system memory into the cache memory occurs fairly rapidly over the high-speed system bus 150. Then, beginning with the first byte of data requested by the ATM card, the data can be communicated from be cache memory 326 to the PCI bus 130. As will be appreciated, this latter transfer may occur without intermittent latency periods.

Finally, FIG. 3C illustrates yet another alternative which may occur in a 64 byte cache line. In this example, the starting address of the ATM cell aligns with the eighth byte of line n of the cache memory 326. By evaluating the simple equation: ending address=starting address+48 bytes, the system and method of the present invention determines that the ending address of the ATM cell will occur at byte 55 on the same cache line of data. Therefore, only one cache line of data must be fetched from the system memory to the cache memory 326.

Figure 4A:
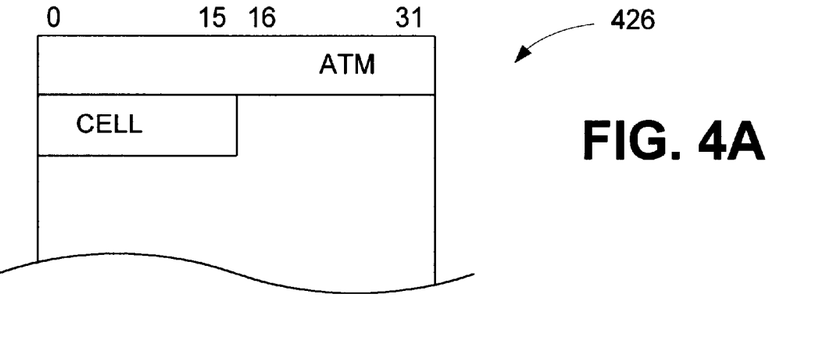
FIGS. 4A–4C are diagrams illustrating an ATM cell disposed in different locations within a cache memory having a 32 byte line size.

As will be appreciated by persons of ordinary skill in the art, the concepts and teachings of the present invention apply equally to other cache memory sizes. In this regard, reference is made to FIGS. 4A–4C, which illustrate ATM transfers, like those of FIGS. 3A–3C for a cache memory 426 having a 32 byte cache line size. In FIG. 4A, the starting address of the ATM cell aligns with the first byte of data in cache line n. Since the payload of the ATM cell comprises 48 bytes, the ending address of the ATM cell will end at the sixteenth byte of the following cache line. Therefore, the system and method of the present invention will immediately fetch two cache lines of data from the system memory to the cache memory 426.

Figure 4B:
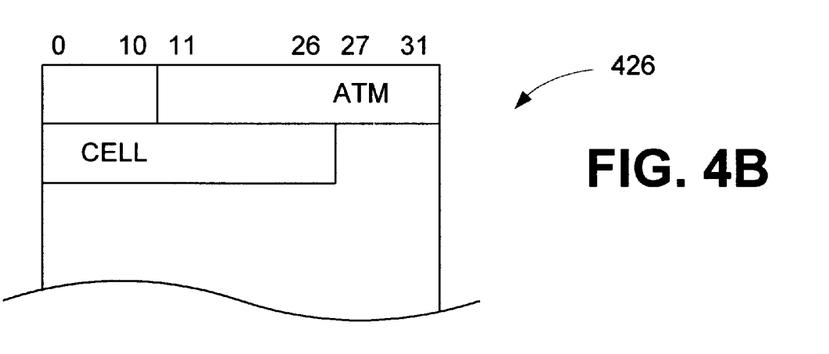
Figure 4C:
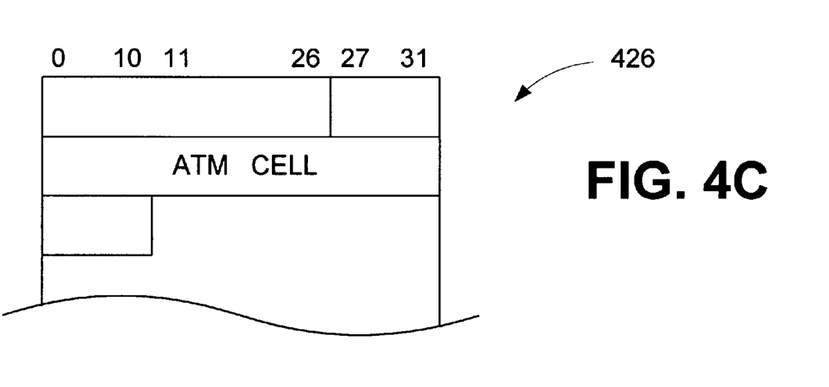

FIG. 4B illustrates an ATM fetch request, wherein the starting address of the ATM cell aligns with byte 11 of data in cache line n. Accordingly, the ending address of the ATM cell will align with byte 26 of the following cache line. In an alternative example, FIG. 4C illustrates an ATM fetch request, wherein the starting address of the ATM cell aligns with byte 27 of data in cache line n. Accordingly, the ATM cell will consume the remainder of that cache line, the entire following cache line, and will end at byte 10 of the following cache line. Accordingly, in this example three cache lines of data will be fetched from the system memory to the cache memory 426.

Figure 5:
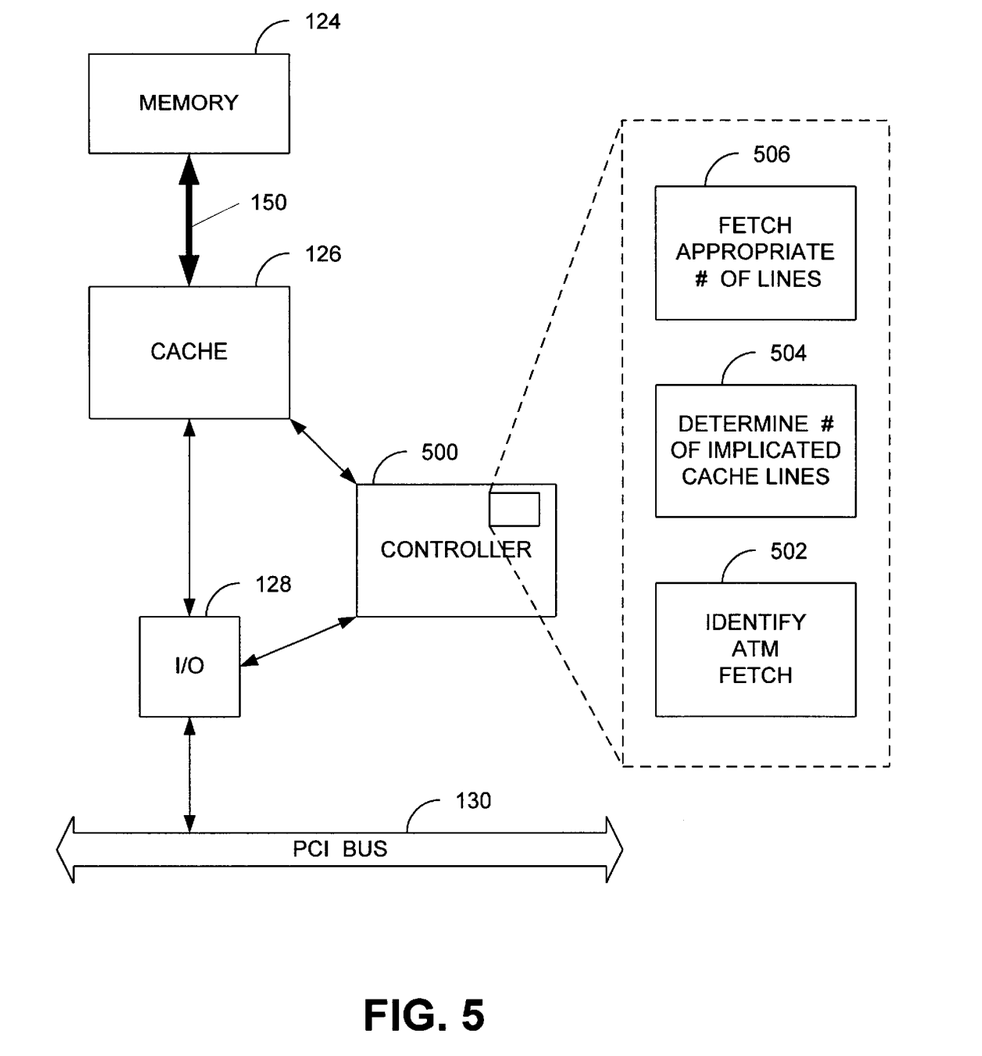
FIG. 5 is a block diagram of a portion of a high-performance computer system constructed in accordance with the present invention.

Reference is now make the FIG. 5, which is a block diagram illustrating certain fundamental components of the system constructed in accordance with the present invention. It will be appreciated, however, that the diagram depicted is presented merely for purposes of illustrating the present convention. Consistent with the inventive concepts expressed and described herein, various alternative system implementations may be provided. As described in connection with FIG. 1, a cache memory 126 is disposed in communication with the system memory 124 via a high-speed system bus 150. The cache memory 126 is disposed in communication with the PCI bus 130. Depending on the system design constraints, the cache memory 126 may directly communicate with the PCI bus 130 or, alternatively, the cache memory 126 may communicate with the PCI bus 130 via an I/O buffering device 128. The buffering device 128 may be a line driver, a buffer, or other device.

In accordance with the invention, a controller 500 is provided to control and coordinate the exchange of data among the system memory 124, the cache memory 126, and PCI bus 130. Preferably, the controller 500 will be implemented in hardware that is configured to carry out various tasks. For example, the controller 500 may include one hardware section 502 that is configured to identify, from the PCI bus 130, the request to fetch a cell of ATM data. The controller 500 may also include another hardware section 504 configured to determine the number of cache lines that are implicated by the fetch request. As previously described, this task is preferably carried out by evaluating the equation: ending address=starting address+48. If the ending address, as calculated by the equation, is greater than the ending address of the last byte if the current cache line of the cache memory 126, then at least two lines of cache data will be implicated. However, depending upon the size of the cache line, additional cache lines may be implicated as well. To make this determination, the line size of the cache memory is subtracted from the ending address. If the result from this further calculation is greater than the line size of the cache memory 126, then at least one additional line of data will be implicated. This latter calculation may be repeated until the remaining amount of data is less than the line size for the cache 126. Further still, the controller 500 may include yet another hardware section 506 configured to control the fetch of data from memory 124, to fetch the appropriate number of cache lines of data from memory 124 to the cache 126.

Of course, as will be appreciated by persons skilled in the art, additional functions or tasks may be performed by the controller 500 in carrying out the concepts of the present invention. In addition, persons skilled in the art will understand how to implement the particular hardware design necessary to implement the present invention. No attempt has been made herein to illustrate such implementation details, as such details will necessarily differ from system to system, and indeed may differ consistent with the broad concepts and teachings of the present invention.

Figure 6:
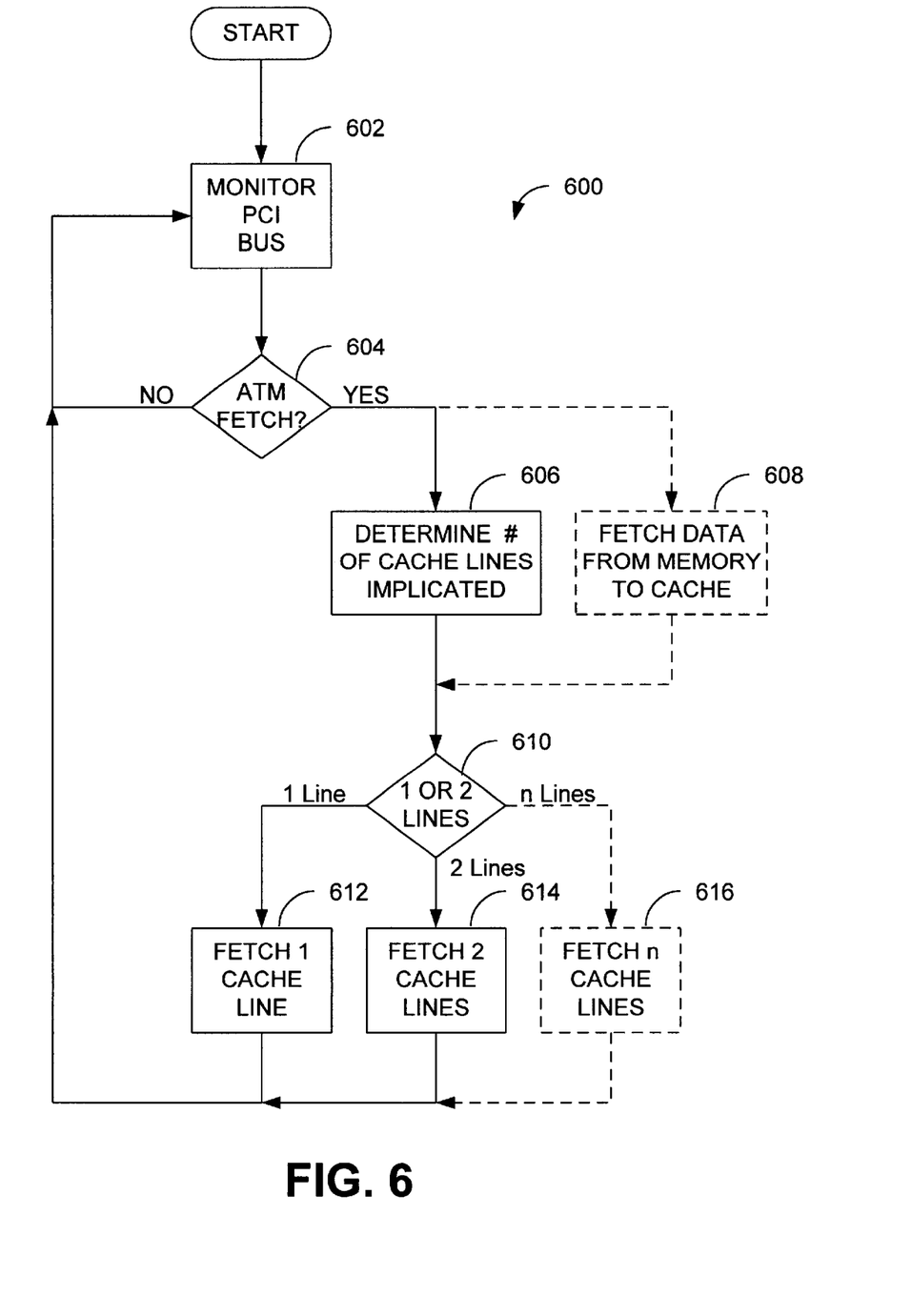
FIG. 6 is a flowchart illustrating the top-level functional operation of a system constructed in accordance with the present invention.

Reference is now made to FIG. 6, which is a flowchart 600 that illustrates a top-level functional operation of the method of the present invention. In this regard, the controller 500 continually monitors the PCI bus 130 to identify a request for ATM data (steps 602 and 604). Upon detecting a request for ATM data, and recognizing that this request entails a fetch of precisely 48 bytes, the method then determines the number of cache lines that will be implicated by the 48 byte fetch (step 606). At the same time, the system may begin fetching the first cache line of data, since at least one line of data must always be fetched from memory 124 (step 608). The method then determines (step 610) whether one line, two lines, or additional lines are implicated by the ATM request. If only one cache line of data is implicated by the request, then the system will fetch only one cache line of data (step 612). If two cache lines of data are implicated by the request, then the system will fetch precisely two cache lines of data (step 614). If some other number of lines of cache data (say n lines) are implicated by the request, then the method of the present invention will fetch precisely that number of lines (step 616).

It will be further appreciated that the steps 602 and 604 of detecting an ATM fetch may be implemented in a variety of ways, consistent with the present invention. That is, the identification/detection of ATM data may be made simply by virtue of knowing that a certain card is an ATM card. This type of information will typically be communicated from the ATM card to the system of the present invention through a software driver provided by/for the ATM card. Alternatively, the system of the present invention may be adapted to identify an ATM card by virtue of the information traffic/format communicated to and from the card.

In this regard, U.S. Pat. No. 5,745,488, which is hereby incorporated by reference, alleges to teach a method for detecting packet types in a communication network. Specifically, this patent purports to disclose a system and method of evaluating packet/cell header information to detect ATM cells. Accordingly, a system and method of this type may be used to identify the ATM cell fetch requests of the present invention. Likewise, other methods may be used as well.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for fetching data from system memory for an ATM (asynchronous transfer mode) card comprising the steps of:

receiving a request to fetch data from system memory;

identifying the request as an ATM request;

determining, based on the start address, the number of cache lines that will be implicated by the fetch;

automatically fetching the appropriate number of cache lines of data from the system memory and passing the data to the ATM card.

2. The method as defined in claim 1, wherein each cache line comprises 64 bytes.

3. The method as defined in claim 2, wherein the step of determining the number of cache lines implicated determines whether one cache line or two cache lines will be implicated by the fetch.

4. The method as defined in claim 3, wherein the step of determining the number of cache lines implicated evaluates the following equation: end address=start address+48.

5. The method as defined in claim 4, wherein two cache lines are fetched if end address is greater than 63, and a single cache line is fetched if end address is less than 64.

6. A system for fetching data from system memory for an ATM (asynchronous transfer mode) card comprising:

system memory for data storage;

a cache memory for providing high-speed temporary storage of data, the cache memory in communication with the system memory via a high-speed system bus;

a PCI (peripheral component interface) bus in communication with the cache memory via an input/output (I/O) bus;

a first mechanism configured to identify a fetch for data from memory to the PCI bus by an ATM card;

a second mechanism configured to determine, based on the starting address, the number of lines of the cache memory that will be implicated by the identified fetch; and     a third mechanism configured to automatically fetch the appropriate number of lines from the cache memory and to pass the data to the PCI bus.

7. The system as defined in claim 6, wherein the cache memory includes a plurality of 64 byte cache lines.

8. The system as defined in claim 6, wherein the first, second, and third mechanisms are electrical circuits specifically designed in an integrated circuit.

9. The system as defined in claim 6, wherein the first, second, and third mechanisms included coded instructions for execution by a processing unit.

10. In a computing system having a system memory for data storage and cache memory for providing high-speed temporary storage of data, the cache memory in communication with the system memory via a high-speed system bus, and a PCI (peripheral component interface) bus in communication with the cache memory via an input/output (I/O) bus, a method for fetching data from the system memory for an ATM (asynchronous transfer mode) card comprising the steps of:

identifying a request by an ATM card to fetch data from the system memory to the PCI bus;

determining, based upon the starting address, the number of lines of the cache memory that will be implicated by the identified fetch;

fetching via the high-speed system bus data from the system memory to fill the number of implicated cache lines; and     automatically fetching the appropriate number of lines from the cache memory and passing the data to the PCI bus.

\* \* \* \* \*